United States Patent Office 3,098,800
Patented July 23, 1963

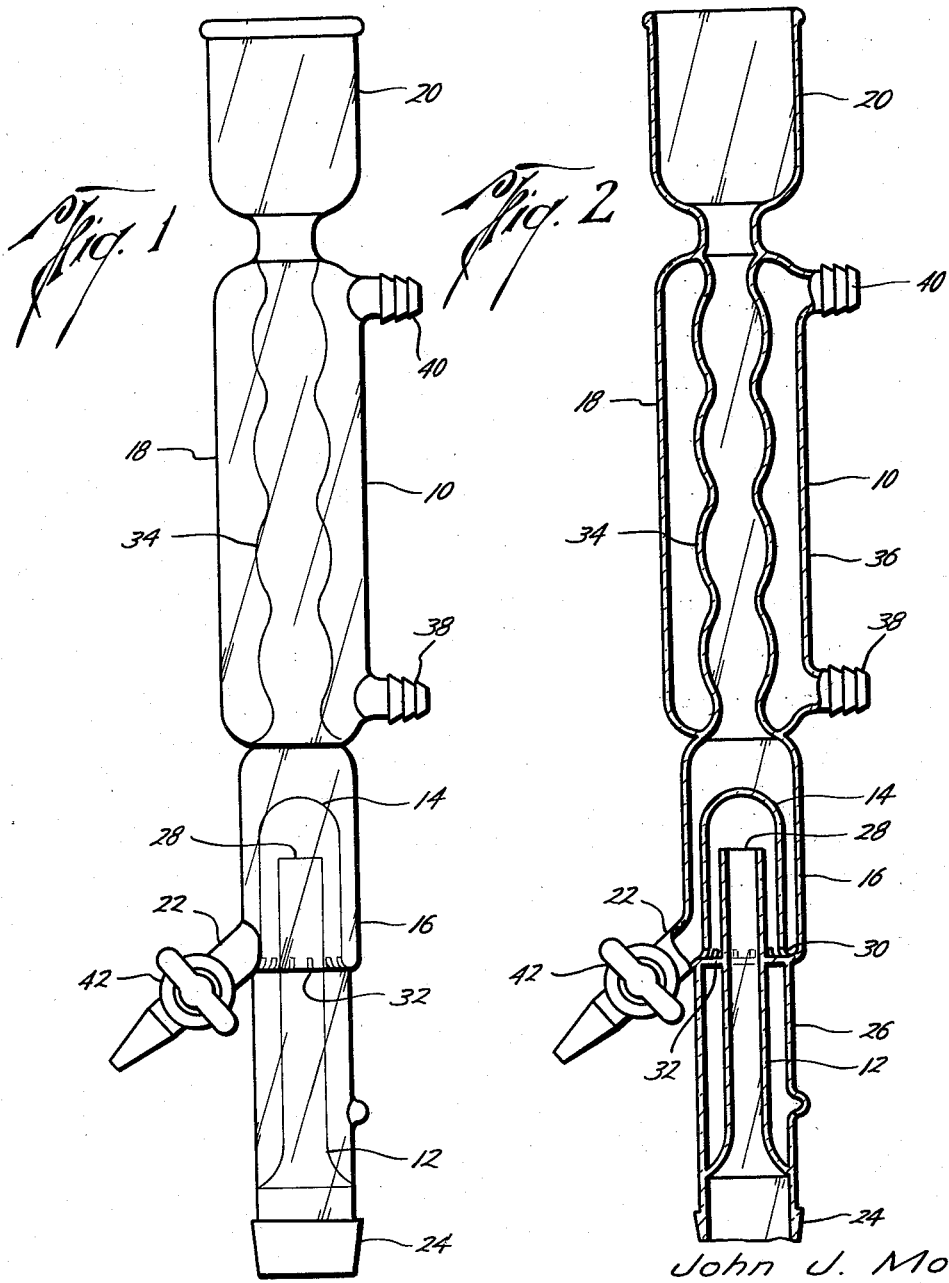

3,098,800
LABORATORY DISTILLATION APPARATUS
John J. Moran and Harold Wood, both of
230 Medical Arts Bldg., Houston, Tex.
Filed Dec. 9, 1960, Ser. No. 74,996
3 Claims. (Cl. 202—170)

The present invention relates to a laboratory distillation apparatus for the extraction and collection of volatile substances from solutions, and more particularly relates to a unitary type of glass laboratory distillation apparatus in which the distillation and extraction of volatile substances from solutions may be quickly and efficiently performed.

While the laboratory distillation apparatus of the present invention is useful for the extraction and collection of many types of volatile substances, it is particularly useful as a distillation extractor for determining iodine in biological fluids. In such a case the organic material containing the iodine is destroyed through the action of acid such as sulfuric acid and the liberated iodine is preserved and prevented from being lost by the action of an oxidizing agent such as chromic acid. Upon the subsequent addition of a reducing substance such as phosphorous acid, the iodine is rendered volatile and may be distilled from the reaction mass upon the application of heat. The distilled vapors are then passed through a trapping fluid such as arsenious acid which retains the iodine. The iodine content in the collected distillate may then be measured through its catalytic activity following the addition of a suitable oxidizing agent such as ceric ammonium sulfate. And the iodine content is then indicative of and can be used to determine the thyroid activity of a person.

However, it is very important that the distillation apparatus be extremely efficient and accurate as the amount of iodine being collected is in micro quantities and it is also very important that the distillation apparatus be easy to clean so that remnants of prior tests will not affect subsequent results.

It is an object of this invention to provide an improved laboratory distillation apparatus generally of a unitary type including a receiving chamber for receiving volatile vapors from a boiling solution, an extraction chamber holding extraction fluid for mixing with and extracting the volatile substance from the vapors, and a condenser connected to the extraction chamber for condensing and remixing the volatile vapors with the extraction solution.

Yet a still further object of the present invention is the provision of a glass laboratory distillation apparatus which includes a tubular receiving chamber to receive vapors from a boiling solution, an enclosure which telescopically encloses the upper end of the receiving chamber and which includes a plurality of openings positioned below the upper end of the receiving chamber so that vapor is required to pass downwardly into the openings where it then encounters an extraction chamber which collects the volatile substances in the vapor but creates a vapor pressure which prevents a back flow of accumulated fluid through the delivery tube.

A still further object of the present invention is the provision of a laboratory distillation apparatus which includes a receiving chamber, an extraction chamber and a condensing chamber arranged in such a manner that cleaning fluids may enter into the top of the apparatus and pass through the various components to reach all of the areas of the interior and thus thoroughly clean the device after each test.

A still further object of the present invention is the provision of a unitary glass laboratory distillation apparatus having a receiving chamber surrounded by an evacuated sleeve which stabilizes temperature conditions and nullifies outside temperature fluctuations.

Other and further objects, features and advantages will be apparent from the following description of a presently preferred embodiment of the invention, given for the purpose of disclosure, and taken in conjunction with the accompanying drawing, where like character references designate like parts throughout the several views, and where FIGURE 1 is an elevational view illustrating an apparatus according to the present invention, and FIGURE 2 is an elevational view, partly in cross-section of the apparatus illustrated in FIGURE 1.

Referring now to the drawings, the reference numeral 10 generally designates the unitary glass laboratory distillation apparatus of the present invention and generally includes a receiving chamber or delivery tube 12 which is adapted to be placed over and collect vapors from a boiling solution (not shown) containing minute or micro quantities of the volatile substance desired to be detected and collected, a vapor directing enclosure 14 having a plurality of openings 30, an extraction chamber 16 which holds an extraction solution which extracts the volatile substances from the vapors as they pass through the solution, a condensing chamber 18 which condenses the unextracted vapors causing them to flow back into the extraction chamber where they again mix with the extraction solution, a funnel 20 for introducing extraction fluid into the apparatus, and a drain 22 whereby the collected distillate in the extraction chamber may be collected and measured.

The receiving chamber 12 may be provided with a male joint 24 such as a standard taper or ball joint to be connected to the top of a container having a boiling solution containing a volatile substance such as iodine (not shown). Preferably the receiving chamber or delivery tube 12 is surrounded by an air evacuated sleeve 26 which stabilizes temperature conditions, nullifies outside temperature fluctuations, and prevents the premature condensation of vapors as they travel because of the applied heat upwardly in the tube 12. An extraction chamber 16 surrounds the upper end of the receiving chamber 12 and is adapted to contain a suitable extraction liquid in which the volatile substance such as iodine may be trapped and collected from the vapor. In order to insure the passage of the boiling vapors through the extraction fluid a vapor directing enclosure 14 is provided over and surrounding the upper end 28 of the receiving chamber 12. At the lower end of the enclosure 14 a plurality of circumferentially spaced openings 30 are provided. It is noted that these openings are positioned below the top of the receiving chamber opening 28 to prevent any back flow or loss of extraction fluid out through the receiving chamber 12 when the vapors pass through the extraction fluid with a bubbling action. It is also noted that the openings 30 are positioned at the bottom of and adjacent the lower end 32 of the extraction chamber 16 whereby the vapors, as they are forced through the enclosure and out of the openings 30, will be thoroughly mixed with the liquid in the extraction chamber 16. The extraction chamber 16 and the openings 30 are sized so that the desired volume of extraction fluid, which in the case of iodine extraction can be as little as 1 ml. of fluid, is sufficient to completely seal the openings 30 to insure the proper trapping of the vapors by the extraction liquid.

Excess vapors pass through the extraction chamber 16 and ascend to the condenser section 18 where they are condensed and the condensate flows back into the extraction chamber 16 where it is further acted on by the extraction fluid. The condenser section 18 may be of any of the conventional types and is here shown as having an undulating interior jacket 34 which is surrounded by an enclosed cooling medium container 36 which includes an inlet 38, an outlet 40 for the circulation through the condenser container 36 of a cooling medium such as water.

A funnel 20 is provided at the top of the condenser 18 which permits the delivery of desired fluids into the chamber 16 and also permits the entry of cleaning fluids through the apparatus for cleaning the various components.

A drain line 22 which is controlled by a stop cock 42 is provided with the drain line connected to the lower end of the extraction chamber 16 so that on the opening of the stop cock 42 the extraction chamber 16 will be completely drained of all accumulated or collected fluid in the chamber.

In use, the glass laboratory distillation apparatus 10 is placed over a container or flask (not shown) in which a solution containing the volatile material which is desired to be extracted and collected by distillation is boiling. The joint 24 is placed adjacent the container or flask and makes a sealing connection therewith to trap the vapors from the boiling solution as they ascend into the receiving chamber 12. Prior to this time an extraction solution has been placed in a funnel 20 and thus passes through the condenser section 18 and is collected at the bottom of the extraction chamber 16 and covers the openings 30.

The vapors ascend through the receiving chamber 12 and are prevented from premature condensation by the air evacuated sleeve 26. The boiling vapors further ascend through the receiving chamber 12 and pass out of the upper end 28 into the vapor enclosure 14. They are then directed downwardly in the enclosure 14 and pass out of the openings 30 where they mix with the extraction liquid in the chamber 16. Generally, the vapor pressure in the enclosure 14 will force all of the extraction liquid out of the enclosure 14 and into the extraction chamber 16 whereby due to the bubbling and boiling action of the vapors, the vapors will be thoroughly mixed and the volatile substance which is desired to be collected is extracted and collected by a scrubbing or mixing action.

Because of the bubbling action as the hot vapors encounter the extraction liquid the receiving chamber 12 must extend upwardly into the enclosure 14 so that the opening 28 will be a sufficient distance above the openings 30 to prevent any backflow or loss of accumulated fluids back through the receiving chamber 12.

The vapors which are not extracted and which pass through the extraction chamber 16 encounter the condenser 18 where they are condensed and the condensate is collected and flows back into the extraction chamber 16 where it is further acted upon by the scrubbing and trapping action of the fluid in the extraction chamber 16. It is noted that the condenser section is open to the atmosphere to prevent build up of dangerous pressures, but provides a sufficient cooling action to quickly cool and prevent the escape of the vapors to the atmosphere.

At the conclusion of the distillation process, the accumulated fluid and extracted volatile substances are drained from the extraction chamber by the opening of the stop cock 42 in the drain 22 which is connected to the bottom of the extraction chamber 16 whereby the extraction chamber will be completely drained of all of the collected fluids and the volatile material content and the collected distillation may then be measured.

The cleansing of the apparatus 10 may be quickly and easily accomplished by passing a cleansing fluid through the funnel 20 where it will pass downwardly through and cleans the interior of a condensing chamber 18, the extraction chamber 16, pass through the openings 30 up into the enclosure 14, and down through the receiving chamber 12. At the same time, the stop cock 42 may be opened to cleanse the drain line 22. The cleansing fluid thus quickly and completely cleans the entire apparatus.

Thus the present invention therefore provides a unitary laboratory distillation apparatus for the extraction and collection of a volatile substance from a boiling solution by providing an efficient device which minimizes the technician's labors and time and yet insures the accuracy and thoroughness of the distillation process.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A unitary glass protein bound iodine distillation apparatus for the extraction of micro quantities of iodine from a boiling solution having an integral glass body comprising, a tubular receiving chamber having upper and lower ends for receiving boiling vapors of iodine, said lower end adapted to be positioned adjacent a container having a boiling solution for receiving said boiling vapors, an air evacuated insulation jacket positioned about said receiving chamber, an enclosure telescopically and completely enclosing the upper end of said receiving chamber except for having a plurality of ports positioned below the upper end of the receiving chamber, an extraction solution chamber surrounding said telescopic enclosure for containing an extraction fluid for trapping said iodine vapors, said extraction chamber positioned to enclose the plurality of ports whereby fluid placed in the extraction chamber will cover said ports, a condenser chamber in fluid communication with the top of the extraction chamber, the upper end of the condenser chamber being in communication with the atmosphere for receiving pressures and for providing an entrance for insertion of fluids into the extraction solution chamber, and a drain outlet connected to the lower end of the extraction chamber.

2. The invention of claim 1 including a funnel connected to the upper end of the condenser chamber for insertion of extraction solutions and cleaning fluids.

3. The invention of claim 1 wherein the extraction chamber is sized so that 1 ml. of extraction solution will completely cover the ports to insure the proper trapping of the vapors by the extraction liquid.

References Cited in the file of this patent

UNITED STATES PATENTS

| 2,095,056 | Clough | Oct. 5, 1937 |
| 2,907,638 | Dryer | Oct. 6, 1959 |
| 2,907,641 | Nottebrock | Oct. 6, 1959 |

OTHER REFERENCES

Hawk: Practical Physiol. Chem., 13th ed., 1954, p. 661.